3,299,082
CHEMICAL COMPOUNDS AND PROCESSES FOR
PREPARING SAME
Robert E. Jones, North Muskegon, Mich., and George
Gal, Summit, N.J., assignors to Merck & Co., Inc.,
Rahway, N.J., a corporation of New Jersey
No Drawing. Filed Aug. 30, 1965, Ser. No. 483,873
5 Claims. (Cl. 260—302)

This is a continuation-in-part of application Serial No. 338,323, filed January 17, 1964, now abandoned, which application is in turn a division of application Serial No. 124,772, filed July 18, 1961, now abandoned.

This invention is concerned generally with a method of preparing acid addition salts of N-phenylamidines. More specifically, it relates to a method of making acid addition salts of N-phenylamidines substituted with a five-membered nitrogen- and sulfur-containing heterocyclic ring. It is concerned further with the novel chemical substances obtained by this process.

According to the instant invention, it has now been found that acid addition salts of N-phenylamidines substituted with a five-membered heterocyclic ring containing nitrogen and sulfur and which may be further substituted at the 3- and/or 4-position, may be obtained from aniline (or a substituted aniline) and a compound of the formula R—CN where R is a five-membered heterocyclic radical. This process may be pictured structurally as follows:

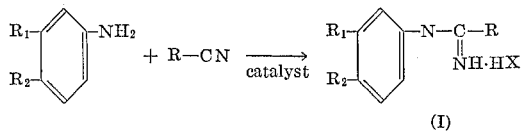

(I)

In the structures shown above, X is a halogen having an atomic weight of between 35 and 80, i.e., chlorine or bromine, and R represents a five-membered heterocyclic ring containing nitrogen and sulfur as the hetero atoms, e.g. thiazolyl, isothiazolyl or thiadiazolyl.

When R is thiazolyl or isothiazolyl, the point of attachment to the carbon atom of the amidine radical in Formula I above may be through any one of the three carbon atoms of the heterocyclic ring. When R is a thiadiazolyl group containing two nitrogen and one sulfur atoms in the ring, the point of attachment may be in either of the two carbon atoms in a 1,2,3-thiadiazole or a 1,2,4-thiadiazole. With the symmetrical 1,2,5-thiadiazoles, only one point of attachment, of course, exists.

$R_1$ and $R_2$ represent hydrogen or halo, for example chlorine or fluorine. One of $R_1$ and $R_2$ may be alkyl, preferably loweralkyl such as methyl, ethyl, isopropyl and the like, phenyl, or a halophenyl group having a halo radical, for example fluoro or chloro, located ortho, meta or para with respect to the phenyl carbon linking the halophenyl group to the benzimidazole moiety. Examples of such halophenyl groups include p-fluorophenyl, p-chlorophenyl, o-fluorophenyl, m-fluorophenyl, and the like. $R_1$ and $R_2$, but not both at any one time, also represents a heterocyclic radical such as thienyl and the like, a loweralkoxy or loweralkylthio group such as methoxy ethoxy, methylthio, propylthio and the like, or a phenoxy or phenylthio group. Accordingly, $R_1$ and $R_2$ represent hydrogen, lower alkyl, lower alkoxy, loweralkylthio, phenoxy, phenylthio, halo, phenyl, halophenyl or thienyl, provided that when $R_1$ and $R_2$ are other than halo, at least one of $R_1$ and $R_2$ is hydrogen.

In accordance with this invention, an N-phenylamidine derivative of a five-membered heterocyclic ring containing nitrogen and sulfur (I) is prepared by contacting a derivative of the heterocyclic compound having the formula R—CN where R is as earlier described, with aniline or a substituted aniline in the presence of a Friedel-Crafts type catalyst such as aluminum chloride, ferrous chloride, zinc chloride, stannous chloride, titanium tetrachloride, aluminum bromide, zinc bromide, and the like. The reaction is conducted at temperatures in the range of 100–200° C. for a relatively short period of time, i.e. reaction periods of less than 2 hours are satisfactory. The reaction product is recovered as an acid addition salt, the particular salt corresponding to the catalyst employed. Thus, when the catalyst is a chloride, a hydrochloride salt is produced. If the Friedel-Crafts catalyst is a bromide salt, the amidine reaction product exists as the hydrobromide. In this way aniline and 4-cyanothiazole are reacted to produce N-phenyl-(thiazole-4-amidine)-hydrohalide. When the aniline compound contains a substituent (designated hereinabove as $R_1$ and $R_2$ at the 3- or 4-position), such substituent survives the reaction and the N-phenylamidine is correspondingly substituted.

The N-phenylamidines of Formula I hereinabove are intermediates in the preparation of benzimidazoles having the structural formula

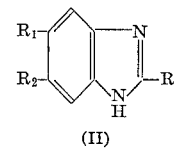

(II)

where R, $R_1$ and $R_2$ have the same meaning as discussed above. These benzimidazoles are obtained by converting said N-phenylamidines to the corresponding hydroxy amidines by reaction with hydroxylamine. This conversion is brought about by intimately contacting the reactants in a suitable solvent medium such as water. The hydroxyamidines are then converted to 2-substituted benzimidazoles by treatment with an alkyl or aryl sulfonyl halide in the presence of a base such as pyridine.

These 2-substituted benzimidazoles (II) are highly efficacious in the treatment and prevention of helminthiasis in animals such as sheep, goats, cattle, horses and swine. When employed as anthelmintic agents, the benzimidazoles are orally administered to the animals in the form of a bolus, or admixed with the feed of the animals.

The following examples are given for the purpose of illustration and not by way of limitation:

*Example 1*

3.0 g. of 4-cyanothiazole (0.0275 mole) is added to 2,75 g. of aniline at 25° C., and 3.65 g. (0.0275 mole) of powdered aluminum chloride gradually stirred into the mixture over a period of 20 minutes. An exothermic reaction ensues and the temperature of the reaction mixture rises to about 120–130° C. After the addition of aluminum chloride is complete, the reaction mixture is heated at 180° C. for 20 minutes. It is then cooled to room temperature and the reaction mass dissolved in 100 ml. of 75% ethanol. The resulting solution is made strongly alkaline with 25% aqueous sodium hydroxide solution and then extracted with 3 x 70 ml. of chloroform. The chloroform extracts are combined, washed with water and dried over potassium carbonate. The chloroform solution is filtered and treated with 1.0 g. of decolorizing charcoal. The charcoal is removed by filtration and the charcoal treatment repeated once more. The resulting yellow solution is concentrated to dryness in vacuo and the residue dissolved in 25 ml. of isopropanol. The pH of the solution is adjusted to 1–1.5 with isopropanolic hydrogen chloride and 500 ml. of ether added slowly, with stirring, at about 10° C. After addition of ether is complete, the mixture is stirred for 1 hour and the resulting solid removed by filtration. The solid is washed with small portions of ether and petroleum ether and then dried in vacuo at 25° C. to give 5.7 g. of N-phenyl-(thiazole-4-amidine)-hydrochloride, M.P. 255–257° C.

When 2-cyanothiazole instead of 4-cyanothiazole is employed in the above process, there is obtained N-phenyl-(thiazole-2-amidine)-hydrochloride. The N-phenylamidine derivatives of other five-membered heterocyclic compounds containing nitrogen and sulfur, such as N-phenyl-(isothiazole-4-amidine)-hydrochloride, N-phenyl-(4-methylthiazole-2-amidine)-hydrochloride and N-phenyl-(1,2,3-thiadiazole-4-amidine)-hydrochloride are obtained in a similar fashion by reacting the appropriate cyano-heterocycle, such as 4-cyano-isothiazole, 2-cyano-4-methylthiazole and 4-cyano-1,2,3-thiadiazole, with equimolar amounts of aniline and aluminum chloride as described above. When a 3- or 4-loweralkoxy or loweralkyl aniline is used as starting material instead of aniline itself, the corresponding N-(3- or 4-loweralkoxy or loweralkyl)-phenylamidine is produced.

When 3-methylthioaniline, 4-phenoxyaniline or 3-phenylthioaniline is used in the above process in place of aniline, there is obtained N-3-methylthiophenyl-(thiazole-4-amidine) hydrochloride, N-4-phenoxyphenyl-(thiazole-4-amidine) hydrochloride or N-3-phenylthiophenyl-(thiazole-4-amidine) hydrochloride, respectively.

Example 2

To 3 g. of 3-chloroaniline is added 3.5 g. of 2-cyanothiazole. 6 g. of powdered titanium tetrachloride is slowly added to the mixture with stirring. The reaction mixture is heated to 190° C. for 25 minutes and then cooled to room temperature. The mixture is then dissolved in 100 ml. of ethanol and the resulting solution made strongly alkaline with 25% aqueous sodium hydroxide. The solution is then extracted with chloroform and the chloroform extracts are combined, washed with water and dried over potassium carbonate. The chloroform solution is treated with charcoal, filtered, and the filtrate evaporated to dryness in vacuo. The residue is dissolved in 35 ml. of isopropanol and the pH of the solution is adjusted to 1–1.5 with isopropanolic hydrogen chloride. Ether (650 ml.) is slowly added with stirring at about 10° C. The mixture is stirred for an additional hour and the resulting solid, N-3-(chlorophenyl)-(thiazole-2-amidine)-hydrochloride is removed by filtration.

When the above process is carried out and 3-(2¹-thienyl)-aniline, 4-phenyl aniline, or 4-(4'-fluorophenyl)-aniline is used in place of 3-chloroaniline, there is obtained N-3-(2'-thienylphenyl)-(thiazole-4-amidine)-hydrochloride, N-4-biphenylyl-(thiazole-4-amidine)-hydrochloride, or N-4-(4'-fluorobiphenyl)-(thiazole-4-amidine)-hydrochloride.

Example 3

The heterocyclic nitrile starting materials for the process of this invention are prepared from the heterocyclic carboxylic acids by the procedure exemplified below:

60 g. of dry thiazole-4-carboxylic acid is added with stirring to 146 ml. of thionyl chloride. The reaction mixture is heated under gentle reflux for 2 hours. The excess thionyl chloride is then removed in vacuo, and 300 ml. of petroleum ether added slowly to the oily residue. The resulting mixture which contains precipitated thiazole-4-carboxylic acid chloride is cooled to 15° C., and the desired acid chloride removed by filtration. It is washed with cold petroleum ether and dried in vacuo, M.P. 85° C.

Approximately 14 g. of dry ammonia gas is added to a solution of 40 g. of thiazole-4-carboxylic acid chloride in 300 ml. of benzene over a period of 1 hour. The temperature is maintained at 30–35° C. The reaction mixture is then aged for 1 hour at 25° C. The solid product is removed by filtration and dried in vacuo. It is suspended in 130 ml. of cold water to dissolve ammonium chloride. The suspension is filtered and washed with cold water. The wet solid is then dissolved in 150 ml. of boiling water, the solution treated with decolorizing charcoal, filtered while hot and cooled to 5° C. The crystalline thiazole-4-carboxamide thus obtained is recovered by filtration and dried in vacuo at 40° C., M.P. 152–153° C.

24 g. of thiazole-4-carboxamide and 20 g. of phosphorus pentoxide are intimately mixed in a round bottomed flask fitted with a short condenser and a receiver. The mixture is heated in an oil bath at a bath temperature of 200–220° C. for 20 minutes. The mixture is then distilled, 4-cyanothiazole distilling at 100–120° C./20 mm. The product is purified by sublimation (65° C./30 mm.), M.P. 60–61° C.

Example 4

This example is included for the purpose of disclosing methods generally applicable in preparing anthelmintically active benzimidazoles from the N-phenylamidine hydrohalides of this invention.

To a solution of 1.05 g. of hydroxylamine hydrochloride in 9 ml. of water there is added 2.39 g. (0.01 mole) of N-phenyl-(thiazole-4-amidine)-hydrochloride, followed by 9 ml. of ethanol. 840 mg. of sodium bicarbonate is added. Following the second addition, the reaction mixture is stirred at 20–25° C. for 10 minutes. It is then diluted with 20 ml. of water and extracted with 3 x 25 ml. of chloroform. The chloroform extracts are combined, washed with 10 ml. of water and dried over magnesium sulfate. The organic solvent solution is filtered and concentrated to dryness in vacuo. The oily residue is triturated with petroleum ether in order to crystallize the N-phenyl-(thiazole-4-hydroxyamidine). This amidine is recovered by filtration and dried in vacuo. It is recrystallized for water to give substantially pure material, M.P. 142–145° C.

42 mg. of methane sulfonyl chloride in 1 ml. of benzene is added dropwise at 5° C. to a mixture of 80 mg. of N-phenyl-(thiazole-4-hydroxyamidine) in 3 ml. of benzene and 0.2 ml. of pyridine. The resulting mixture is allowed to stand at room temperature for 15 hours and the solid pyridine hydrochloride then removed by filtration. The filtrate is concentrated to dryness in vacuo and the resulting residue treated with 5 ml. of an 0.1 N sodium carbonate solution. The resulting solid is separated and dissolved in 2 ml. of 0.1 N hydrochloric acid. The acid solution is filtered and the pH then adjusted to 6 with ammonium hydroxide. 2-(4'-thiazoyl-benzimidazole precipitates and is recovered by filtration, washing with water and drying in vacuo.

When N-phenyl-(thiazole-4-amidine)-hydrochloride is replaced by an appropriate heterocyclic derivative of a phenyl amidine hydrochloride, a corresponding benzimidazole may be prepared.

Any departure from the above description which conforms to the present invention is intended to be included within the scope of the appended claims.

What is claimed is:
1. A hydrohalide acid addition salt of a compound having the formula

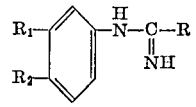

where R is a five membered heterocyclic radical selected from the class consisting of thiazolyl, thiadiazolyl and isothiazolyl rings, the point of attachment of the heterocyclic ring to the amidine carbon atom being at a carbon atom of said heterocyclic rings; and $R_1$ and $R_2$ are hydrogen, loweralkyl, loweralkoxy, loweralkylthio, phenoxy, phenylthio, halo, phenyl, halophenyl or thienyl, provided that when both $R_1$ and $R_2$ are other than halo, at least one of $R_1$ and $R_2$ is hydrogen.
2. N-phenyl-(thiazole-4-amidine)-hydrohalide.
3. N-phenyl-(thiazole-2-amidine)-hydrohalide.
4. N-phenyl-(thiazole-4-amidine)-hydrochloride.
5. N-phenyl-(thiazole-4-amidine)-hydrobromide.

References Cited by the Examiner

Wagner and Zook: Synthetic Organic Chemistry, 1953, page 635.

ALEX MAZEL, *Primary Examiner.*

R. J. GALLAGHER, *Assistant Examiner.*